US011718341B2

United States Patent
Kunihiro et al.

(10) Patent No.: US 11,718,341 B2
(45) Date of Patent: Aug. 8, 2023

(54) VEHICLE DRIVER ASSISTANCE SYSTEM

(71) Applicants: Toyota Jidosha Kabushiki Kaisha, Toyota (JP); Denso Corporation, Kariya (JP)

(72) Inventors: Yoji Kunihiro, Susono (JP); Takahiro Kojo, Gotemba (JP); Yuji Watari, Toyota (JP); Hisaya Akatsuka, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 284 days.

(21) Appl. No.: 17/315,546

(22) Filed: May 10, 2021

(65) Prior Publication Data

US 2021/0354748 A1    Nov. 18, 2021

(30) Foreign Application Priority Data

May 18, 2020 (JP) .................... 2020-087023

(51) Int. Cl.
  *B62D 5/04* (2006.01)
  *B62D 1/04* (2006.01)
  *B62D 15/02* (2006.01)

(52) U.S. Cl.
  CPC ........... *B62D 5/0463* (2013.01); *B62D 1/046* (2013.01); *B62D 15/025* (2013.01)

(58) Field of Classification Search
  CPC .... B62D 5/0463; B62D 1/046; B62D 15/025; B62D 6/007; B62D 6/00
  See application file for complete search history.

(56) References Cited

U.S. PATENT DOCUMENTS 1,963,995 A * 6/1934 Journey ................. A01G 13/06
                                                              431/63
5,991,675 A * 11/1999 Asanuma ........... B60G 17/0195
                                                              701/41
(Continued)

FOREIGN PATENT DOCUMENTS

BR    102016001197 B1 * 12/2021    .......... B60W 30/182
CN    102712340 A   * 10/2012      .......... B62D 5/0463
(Continued)

OTHER PUBLICATIONS

"Simulation of Driving Force Power Steering Control System Based on AMESim and Simulink;" Jin et al.; 2010 International Conference on Intelligent Computation Technology and Automation (vol. 3, pp. 329-332); Sep. 3, 2010. (Year: 2010).*
(Continued)

*Primary Examiner* — Khoi H Tran
*Assistant Examiner* — Jorge O Peche
(74) *Attorney, Agent, or Firm* — Dinsmore & Shohl LLP

(57) ABSTRACT

A vehicle driver assistance system includes: a steering assist torque generation device configured to generate steering assist torque; a control device configured to control the steering assist torque generation device; and a switch configured to switch a steering mode between a manual steering mode and an automatic steering mode. The manual steering mode is a mode in which steered wheels are steered as a driver operates a steering wheel. The automatic steering mode is a mode in which the steered wheels are steered by the steering assist torque generated by the steering assist torque generation device.

9 Claims, 11 Drawing Sheets

(56) References Cited

U.S. PATENT DOCUMENTS

| | | | | |
|---|---|---|---|---|
| 6,041,887 A * | 3/2000 | Kojo | B62D 5/008 | 180/446 |
| 6,098,741 A * | 8/2000 | Glut, Jr. | B62D 6/00 | 180/421 |
| 6,170,600 B1 * | 1/2001 | Shimizu | B62D 1/28 | 701/41 |
| 6,382,345 B2 * | 5/2002 | Kada | B62D 5/0463 | 180/446 |
| 6,705,424 B2 * | 3/2004 | Ogawa | B62D 1/163 | 701/41 |
| 7,203,582 B2 * | 4/2007 | Yokota | B62D 5/046 | 180/443 |
| 7,295,908 B2 * | 11/2007 | Goto | B62D 6/003 | 180/443 |
| 7,359,778 B2 * | 4/2008 | Goto | B62D 6/002 | 180/443 |
| 7,581,616 B2 * | 9/2009 | Goto | B62D 6/003 | 180/402 |
| 7,712,572 B2 * | 5/2010 | Schonauer | B62D 1/12 | 74/552 |
| 7,837,004 B2 * | 11/2010 | Yasuda | B62D 5/008 | 180/407 |
| 8,091,679 B2 * | 1/2012 | Sakaguchi | B62D 5/049 | 318/434 |
| 8,511,420 B2 * | 8/2013 | Kojo | B62D 6/002 | 180/443 |
| 9,352,775 B2 * | 5/2016 | Brown | B62D 6/008 | |
| 9,387,875 B2 * | 7/2016 | Shimizu | B62D 6/008 | |
| 9,404,749 B2 * | 8/2016 | Hill | E02F 9/26 | |
| 9,527,525 B2 * | 12/2016 | Inoue | B62D 6/003 | |
| 9,586,619 B1 * | 3/2017 | Akatsuka | B62D 15/025 | |
| 10,065,656 B2 * | 9/2018 | Otsuka | B60W 50/082 | |
| 2003/0050748 A1 * | 3/2003 | Iwazaki | B62D 1/286 | 180/443 |
| 2003/0168275 A1 * | 9/2003 | Sakugawa | B62D 15/025 | 180/402 |
| 2005/0236223 A1 * | 10/2005 | Yokota | B62D 5/008 | 701/41 |
| 2006/0095195 A1 * | 5/2006 | Nishimura | B60W 30/025 | 701/96 |
| 2008/0091321 A1 * | 4/2008 | Nishikawa | B60W 30/12 | 701/44 |
| 2008/0281486 A1 * | 11/2008 | Sakuma | B62D 5/008 | 701/41 |
| 2008/0306655 A1 * | 12/2008 | Ukai | B62D 5/0463 | 701/41 |
| 2009/0024278 A1 * | 1/2009 | Kondo | B62D 15/025 | 701/41 |
| 2010/0138112 A1 * | 6/2010 | Suzuki | B62D 15/025 | 701/42 |
| 2011/0004385 A1 * | 1/2011 | Ishimoto | B60T 7/12 | 188/106 F |
| 2011/0015805 A1 * | 1/2011 | Seger | B62D 6/007 | 701/1 |
| 2011/0137488 A1 * | 6/2011 | Sakugawa | B62D 15/025 | 701/1 |
| 2012/0109415 A1 * | 5/2012 | Nitta | B60T 8/17557 | 701/1 |
| 2012/0197496 A1 * | 8/2012 | Limpibunterng | B62D 1/286 | 701/42 |
| 2012/0215406 A1 * | 8/2012 | Tanimoto | B62D 15/025 | 701/41 |
| 2012/0239255 A1 * | 9/2012 | Kojima | B62D 15/025 | 701/42 |
| 2013/0096778 A1 * | 4/2013 | Goto | B62D 5/008 | 701/41 |
| 2013/0261898 A1 * | 10/2013 | Fujita | B62D 6/003 | 701/42 |
| 2015/0191199 A1 * | 7/2015 | Tsubaki | B62D 6/10 | 701/42 |
| 2015/0259006 A1 * | 9/2015 | Inoue | B62D 6/007 | 701/41 |
| 2016/0129933 A1 * | 5/2016 | Akatsuka | B62D 15/025 | 180/446 |
| 2016/0129934 A1 * | 5/2016 | Akatsuka | B62D 15/025 | 180/446 |
| 2016/0129935 A1 * | 5/2016 | Akatsuka | B62D 6/002 | 180/446 |
| 2016/0362116 A1 * | 12/2016 | Otsuka | B60W 50/0098 | |
| 2017/0217477 A1 * | 8/2017 | Akatsuka | B62D 6/002 | |
| 2017/0349213 A1 * | 12/2017 | Abdel-Rahman | B62D 6/003 | |
| 2018/0015947 A1 * | 1/2018 | Akatsuka | B62D 15/025 | |
| 2018/0148063 A1 * | 5/2018 | Tatsushiro | B60W 30/18009 | |
| 2018/0178834 A1 * | 6/2018 | Moreillon | B62D 5/0463 | |
| 2018/0181132 A1 * | 6/2018 | Kunihiro | G05D 1/0088 | |
| 2018/0257700 A1 * | 9/2018 | Ishikawa | B62D 5/0472 | |
| 2018/0297631 A1 * | 10/2018 | Miyatani | B62D 6/00 | |
| 2019/0161116 A1 * | 5/2019 | Moreillon | B62D 6/00 | |
| 2019/0241214 A1 * | 8/2019 | Oka | B62D 6/10 | |
| 2020/0198634 A1 * | 6/2020 | Yashiro | G08G 1/16 | |
| 2020/0290668 A1 * | 9/2020 | Moreillon | B62D 6/005 | |
| 2020/0377148 A1 * | 12/2020 | Nakade | B62D 1/286 | |
| 2021/0031804 A1 * | 2/2021 | Oyama | B60W 40/06 | |
| 2021/0061344 A1 * | 3/2021 | Kitazume | B62D 1/286 | |
| 2021/0245757 A1 * | 8/2021 | Imamura | B60T 7/18 | |
| 2021/0253161 A1 * | 8/2021 | Yoshida | B62D 15/021 | |
| 2021/0354748 A1 * | 11/2021 | Kunihiro | B62D 5/0463 | |
| 2023/0023426 A1 * | 1/2023 | Hamaguchi | B62D 15/025 | |

FOREIGN PATENT DOCUMENTS

| | | | | |
|---|---|---|---|---|
| CN | 104808699 A * | 7/2015 | | |
| CN | 105599806 A * | 5/2016 | | B62D 5/0463 |
| CN | 108137093 A * | 6/2018 | | B62D 15/025 |
| CN | 108501944 A * | 9/2018 | | B60W 30/02 |
| CN | 108883788 A * | 11/2018 | | B62D 5/046 |
| CN | 109963773 A * | 7/2019 | | B60W 10/20 |
| CN | 108297936 B * | 6/2020 | | B62D 1/28 |
| CN | 111994167 A * | 11/2020 | | B62D 1/286 |
| DE | 112015000480 T5 * | 11/2016 | | B62D 1/286 |
| DE | 102016216796 A1 * | 3/2017 | | B62D 15/025 |
| DE | 102016216797 A1 * | 3/2017 | | B62D 15/025 |
| DE | 102017221007 A1 * | 5/2018 | | B60K 6/365 |
| DE | 112015000480 B4 * | 2/2021 | | B62D 1/286 |
| EP | 1024072 A1 * | 8/2000 | | B62D 6/00 |
| EP | 2172386 A1 * | 4/2010 | | B62D 15/025 |
| JP | 2004-203117 A | 7/2004 | | |
| JP | 3738673 B2 * | 1/2006 | | |
| JP | 3843804 B2 * | 11/2006 | | |
| JP | 3912279 B2 | 5/2007 | | |
| JP | 2009051492 A * | 3/2009 | | |
| JP | 2015157612 A * | 9/2015 | | |
| JP | 2018103761 A * | 7/2018 | | B62D 15/0255 |
| JP | 2019023080 A * | 2/2019 | | B60K 6/365 |
| JP | 2021000950 A * | 1/2021 | | B62D 15/021 |
| JP | 7036732 B2 * | 3/2022 | | B60L 15/20 |
| KR | 0161771 B1 * | 12/1998 | | |
| KR | 20100074305 A * | 7/2010 | | |
| WO | WO-2017056975 A1 * | 4/2017 | | B62D 15/021 |
| WO | WO-2017060958 A1 * | 4/2017 | | B62D 1/00 |
| WO | WO-2017068895 A1 * | 4/2017 | | B62D 15/025 |
| WO | WO-2018047591 A1 * | 3/2018 | | B62D 5/04 |
| WO | WO-2018051838 A1 * | 3/2018 | | B62D 15/021 |
| WO | WO-2019107437 A1 * | 6/2019 | | B62D 15/025 |
| WO | WO-2019107438 A1 * | 6/2019 | | B62D 15/025 |
| WO | WO-2019225289 A1 * | 11/2019 | | B62D 15/025 |
| WO | WO-2021224230 A1 * | 11/2021 | | |
| WO | WO-2022038808 A1 * | 2/2022 | | |

OTHER PUBLICATIONS

"Electric power steering with Permanent magnet synchronous motor drive used in automotive application;" Shriwastava et al.; 2011 1st International Conference on Electrical Energy Systems (pp. 145-148); Jan. 1, 2011.(Year: 2011).*

"Fault-Tolerant Architecture for an Actuator Concept in Highly Automated Cars;" Buchali et al.; Buchali et al.; 2019 IEEE Vehicle Power and Propulsion Conference (VPPC) (pp. 1-6); Feb. 7, 2020. (Year: 2020).*

(56) References Cited

OTHER PUBLICATIONS

"An Improved Nonlinear Predictive Control Strategy Enhanced by Fractional Order Extremum Seeking Control of the Antilock Braking System of a Vehicle;" He et al.; IEEE Access (vol. 8, pp. 168576-168588); Jan. 1, 2020. (Year: 2020).*

* cited by examiner

VEHICLE DRIVER ASSISTANCE SYSTEM

CROSS-REFERENCE TO RELATED APPLICATION

This application claims priority to Japanese Patent Application No. 2020-087023 filed on May 18, 2020, incorporated herein by reference in its entirety.

BACKGROUND

1. Technical Field

The disclosure relates to driver assistance systems for vehicles such as automobiles.

2. Description of Related Art

When steered wheels are steered by a driver assistance system, the steered wheels are automatically steered by automatic steering torque generated by an electric power steering system. A vehicle equipped with the driver assistance system has a mode switch that is operated by a driver. When the mode switch is on, the steered wheels are automatically steered. The steering mode is thus switched between a manual steering mode and an automatic steering mode. The manual steering mode is a mode in which the steered wheels are steered as the driver operates a steering wheel. The automatic steering mode is a mode in which the steered wheels are steered by steering assist torque generated by the electric power steering system.

When the steering mode is switched from the manual steering mode to the automatic steering mode, the steered wheels are automatically steered so that the steering angle of the steered wheels becomes a desired steering angle of driver assistance. In the case where a large amount of automatic steering is performed when the steering mode is switched from the manual steering mode to the automatic steering mode, the rotation angle and rotational speed of the steering wheel increase greatly and the behavior of the vehicle also changes greatly. It is therefore inevitable that the driver and a passenger(s) feel discomfort.

For example, as described in Japanese Unexamined Patent Application Publication No. 2004-203117 (JP 2004-203117 A), it is known that the maximum value of the steering speed of automatic steering when the steering mode is switched from the manual steering mode to the automatic steering mode is made smaller when the driver is holding the steering wheel than when the driver is not holding the steering wheel. According to this configuration, the maximum value of the steering speed of automatic steering is limited when the driver is holding the steering wheel. This configuration can thus reduce the possibility of the driver and a passenger(s) feeling discomfort due to an increase in rotational speed of the steering wheel and an increase in change in behavior of the vehicle.

SUMMARY

In the driver assistance system described in JP 2004-203117 A, however, the steering speed of automatic steering when the steering mode is switched from the manual steering mode to the automatic steering mode is not limited by the limit value as long as it is equal to or lower than the limit value, even when the driver is holding the steering wheel. Accordingly, when the amount of automatic steering when the steering mode is switched is the same, the steering speed of automatic steering when the driver is holding the steering wheel is the same as the steering speed of automatic steering when the driver is not holding the steering steel.

However, when the limit value is set to a large value, the steering speed of automatic steering may become a large value. Accordingly, the possibility of the driver and a passenger(s) feeling discomfort cannot be effectively reduced. On the contrary, when the limit value is set to a small value, the steering speed of automatic steering is excessively limited, and the steering angle of the steered wheels cannot be quickly controlled to the desired steering angle of the driver assistance, and the driver assistance cannot be provided effectively.

The disclosure provides a driver assistance system improved to reduce the possibility of a driver and a passenger(s) feeling discomfort due to automatic steering when the steering mode is switched from a manual steering mode to an automatic steering mode while effectively providing driver assistance.

A vehicle driver assistance system according to a first aspect of the disclosure includes: a steering assist torque generation device configured to generate steering assist torque; a control device configured to control the steering assist torque generation device; and a switch configured to switch a steering mode between a manual steering mode and an automatic steering mode, the manual steering mode being a mode in which a steered wheel is steered as a driver operates a steering wheel, and the automatic steering mode being a mode in which the steered wheel is steered by the steering assist torque generated by the steering assist torque generation device. The control device is configured to acquire information on steering torque and is configured to calculate desired steering assist torque based on the steering torque, the desired steering assist torque being torque that reduces a burden of operation of the steering wheel on the driver.

The control device is configured to control the steering assist torque generation device so as to control the steering assist torque to the desired steering assist torque when the steering mode is the manual steering mode. The control device is configured to calculate a desired index value of a steering angle of the steered wheel and desired automatic steering torque and control the steering assist torque generation device so as to control the steering assist torque to a sum of the desired automatic steering torque and the desired steering assist torque when the steering mode is the automatic steering mode, the desired index value of the steering angle of the steered wheel being a value for controlling a traveling state of a vehicle to a desired traveling state, and the desired automatic steering torque being torque for controlling an index value of the steering angle of the steered wheel to the desired index value.

The control device is configured to determine whether the driver is holding the steering wheel, and is configured to configured to calculate the desired automatic steering torque so as to make a rate of change in the desired automatic steering torque lower when the steering mode switches from the manual steering mode to the automatic steering mode in a situation where determination is made that the driver is holding the steering wheel than when the steering mode switches from the manual steering mode to the automatic steering mode in a situation where determination is made that the driver is not holding the steering wheel.

In the above aspect, the vehicle driver assistance system may further include a touch sensor configured to output a hold signal when the driver is holding the steering wheel. The control device may be configured to determine that the driver is holding the steering wheel when the hold signal has been output from the touch sensor.

In the above aspect, the control device may be configured to determine that the driver is holding the steering wheel when magnitude of the steering torque is equal to or larger than a reference value for determining whether the driver is holding the steering wheel.

In the above aspect, the vehicle driver assistance system may further include a touch sensor configured to output a hold signal when the driver is holding the steering wheel. The control device may be configured to determine that the driver is holding the steering wheel when the hold signal has been output from the touch sensor and magnitude of the steering torque is equal to or larger than a reference value for determining whether the driver is holding the steering wheel.

In the above aspect, the control device may be configured to make the rate of change in the desired automatic steering torque lower when the magnitude of the steering torque is equal to or larger than a reference value for determining whether the driver is steering the steering wheel than when the magnitude of the steering torque is smaller than the reference value for determining whether the driver is steering the steering wheel, in the case where the steering mode switches from the manual steering mode to the automatic steering mode in the situation where determination is made that the driver is holding the steering wheel.

In the above aspect, the control device may be configured to variably set the rate of change in the desired automatic steering torque according to the magnitude of the steering torque in such a manner that the rate of change in the desired automatic steering torque decreases as the magnitude of the steering torque increases.

In the above aspect, the control device may be configured not to reduce the rate of change in the desired automatic steering torque when the desired index value of the steering angle of the steered wheel is a desired index value of the steering angle for moving the vehicle in a lateral direction in order to further improve driving safety of the vehicle.

In the above aspect, the desired automatic steering torque may be a sum of desired automatic steering torque of feedforward control and desired automatic steering torque of feedback control that are torques for controlling the index value of the steering angle of the steered wheel to the desired index value, and the control device may be configured to reduce a rate of change in the desired automatic steering torque of the feedforward control.

In the above aspect, the desired automatic steering torque may be a sum of desired automatic steering torque of feedforward control and desired automatic steering torque of feedback control that are torques for controlling the index value of the steering angle of the steered wheel to the desired index value, and the control device may be configured to reduce a rate of change in the sum.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
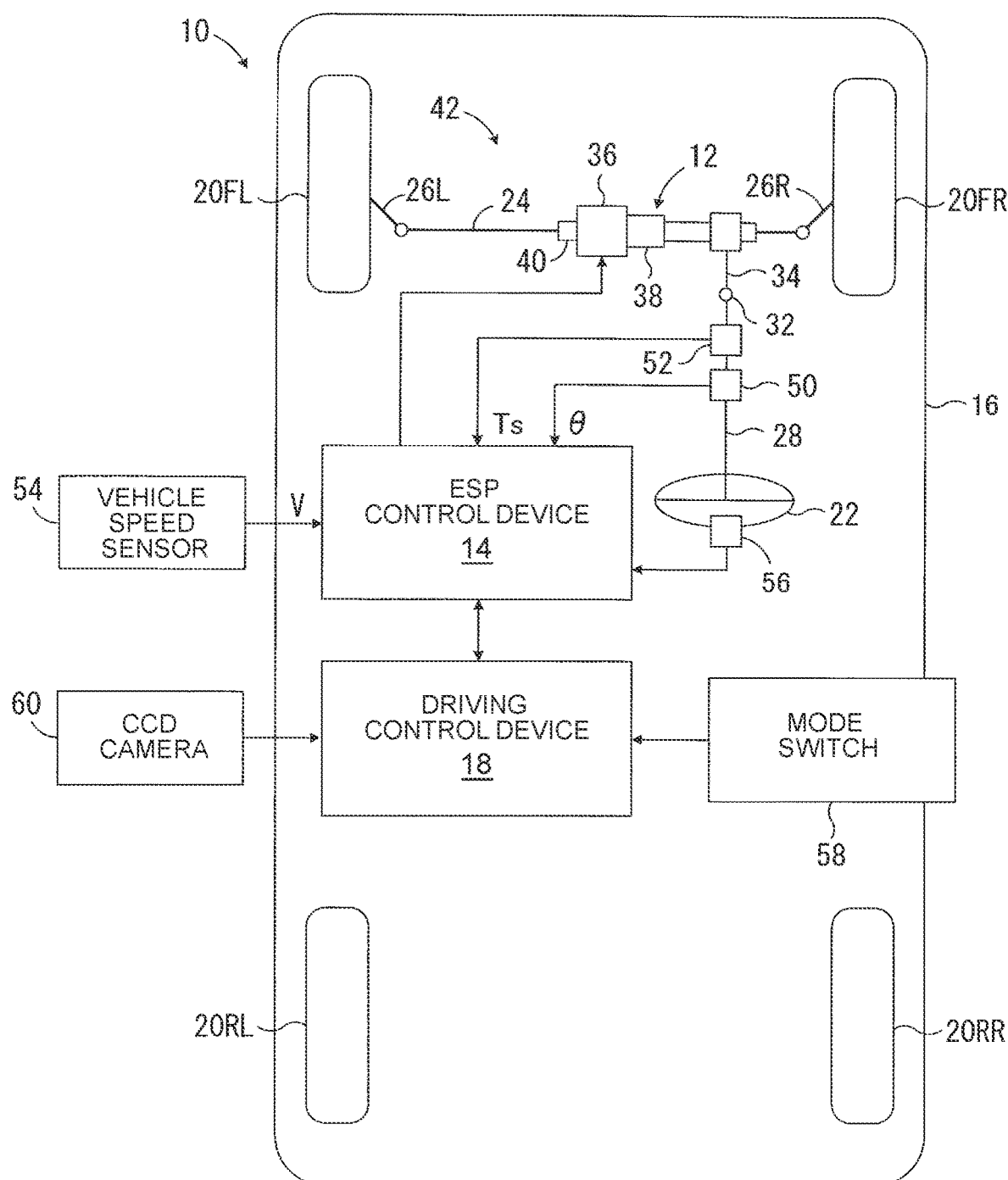
FIG. 1 is a schematic configuration diagram of a vehicle driver assistance system according to a first embodiment of the disclosure.

Embodiments of the disclosure will be described in detail with reference to the accompanying drawings.

First Embodiment

A vehicle driver assistance system 10 according to a first embodiment of the disclosure includes an electric power steering system 12, an electric power steering control device 14 that is a control device for controlling the electric power steering system 12, and a driving control device 18 that controls traveling of a vehicle 16. The electric power steering system 12 functions as a steering assist torque generation device that generates steering assist torque Ta. Hereinafter, the electric power steering system is referred to as the "EPS system," and the electric power steering control device is referred to as the "EPS control device."

As shown in FIG. 1, the vehicle 16 has right and left front wheels 20FR, 20FL that are steered wheels and right and left rear wheels 20RR, 20RL that are non-steered wheels. The front wheels 20FR, 20FL are steered via a rack bar 24 and tie rods 26R, 26L by the EPS system 12 that is driven in response to an operation of the steering wheel 22 by the driver. A steering wheel 22 is connected to a pinion shaft 34 of the EPS system 12 via a steering shaft 28 and a universal joint 32.

In the illustrated embodiment, the EPS system 12 is a rack-direct-drive electric power steering system and includes an electric motor 36 and, e.g., a ball screw conversion mechanism 38 that converts rotational torque of the electric motor 36 to a force in the direction in which the rack bar 24 reciprocates. The EPS system 12 generates a force that drives the rack bar 24 with respect to a housing 40. The EPS system 12 thus reduces the steering burden on the driver and generates driving torque for automatically steering the front wheels 20FR, 20FL. Control of the EPS system 12 by the EPS control device 14 will be described in detail later.

As can be seen from the above description, the steering shaft 28, the universal joint 32, the EPS system 12, the rack bar 24, the tie rods 26R, 26L, etc. form a steering device 42 that steers the front wheels 20FR, 20FL as needed. Although the EPS system 12 is configured to apply a driving force to the rack bar 24, the EPS system 12 may be configured to apply torque to, e.g., the steering shaft 28 or the pinion shaft 34.

In the illustrated embodiment, the steering shaft 28 is provided with a steering angle sensor 50 and a steering torque sensor 52. The steering angle sensor 50 detects the rotation angle of the steering shaft as a steering angle θ, and the steering torque sensor 52 detects the torque of the steering shaft as steering torque Ts. The steering torque sensor 52 may be provided on the pinion shaft 34. A signal indicating the steering angle θ and a signal indicating the steering torque Ts are input to the EPS control device 14. The vehicle 16 is provided with a vehicle speed sensor 54. The vehicle speed sensor 54 detects the vehicle speed V, and a signal indicating the vehicle speed V is also input to the EPS control device 14.

The steering angle θ and the steering torque Ts take positive values when the vehicle is steered in the left turning direction. The same applies to calculated values such as a desired steering angle θlkat and desired automatic steering torque Tast that will be described later. The steering angle θ is an index value of the steering angles of the right and left front wheels 20FR, 20FL that are the steered wheels, and the desired steering angle θlkat is a desired index value of the steering angle.

The steering wheel 22 is provided with a touch sensor 56. The touch sensor 56 detects whether the driver is holding the steering wheel. The touch sensor 56 outputs a hold signal to the EPS control device 14 or the driving control device 18 when the driver is holding the steering wheel. The touch sensor 56 does not output a hold signal to the EPS control device 14 or the driving control device 18 when the driver is not holding the steering wheel.

As shown in FIG. 1, the driver assistance system 10 further includes a mode switch 58 that is operated by the driver. The mode switch 58 is configured to switch the steering mode between a manual steering mode and an automatic steering mode as it is switched between on and off. The manual steering mode a mode in which the right and left front wheels 20FR, 20FL that are the steered wheels are steered as the driver manually operates the steering wheel 22. The automatic steering mode is a mode in which the right and left front wheels 20FR, 20FL are steered by the steering assist torque Ta generated by the EPS system 12. A signal indicating whether the mode switch 58 is on is input to the driving control device 18.

The vehicle 16 is also provided with a charge coupled device (CCD) camera 60. The CCD camera 60 captures an image of the area ahead the vehicle. A signal indicating information of the image of the area ahead of the vehicle captured by the CCD camera 60 is input to the driving control device 18. When the mode switch 58 is on and the steering mode is the automatic steering mode, the driving control device 18 performs path control (lane keeping assist (LKA) control) as automatic steering control, as will be described in detail later.

The path control is control in which the vehicle is caused to travel along a desired path (desired travel path) by automatically steering the steered wheels. In the following description, the path control is referred to as the "LKA control" as necessary. The mode switch 58 functions as a select switch for selecting whether to perform the path control.

Each of the EPS control device 14 and the driving control device 18 includes a microcomputer having a central processing unit (CPU), a read only memory (ROM), a random access memory (RAM), and an input and output port device which are connected to each other by a bidirectional common bus. The EPS control device 14 and the driving control device 18 send and receive information to and from each other by communication, as necessary.

Figure 2:
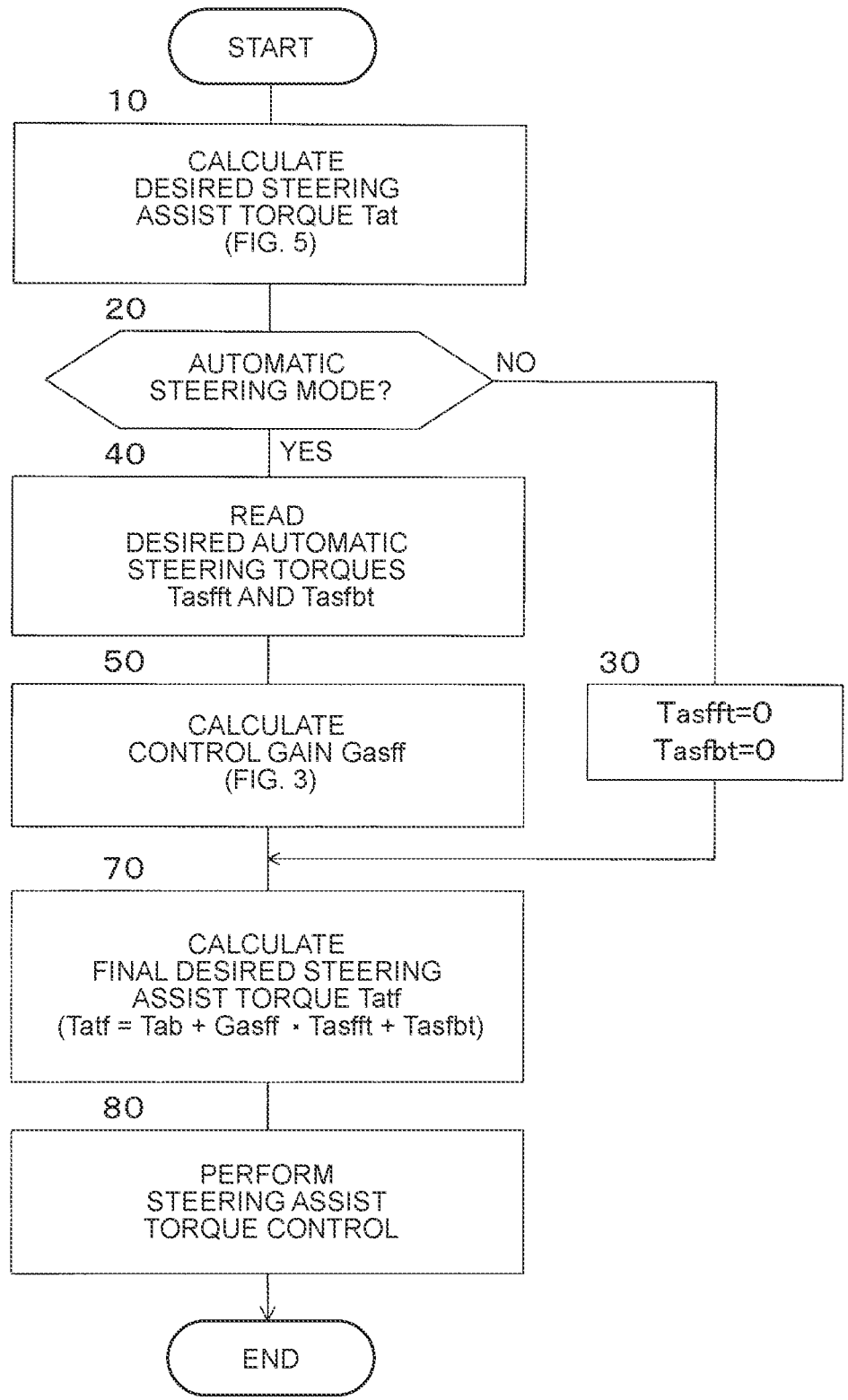
FIG. 2 is a flowchart of a steering assist torque control routine in the first embodiment.

As will be described in detail later, the EPS control device 14 calculates final desired steering assist torque Tatf according to the flowchart of FIG. 2. Specifically, the EPS control device 14 calculates the final desired steering assist torque Tatf as the sum of desired steering assist torque Tat that reduces the steering burden on the driver and improves the steering feeling of the driver and desired automatic steering torque of the LKA control. The EPS control device 14 also controls the EPS system 12 so that the steering assist torque Ta becomes the final desired steering assist torque Tatf. When the steering mode set by the mode switch 58 is the manual steering mode, the desired automatic steering torque of the LKA control is set to 0.

Figure 4:
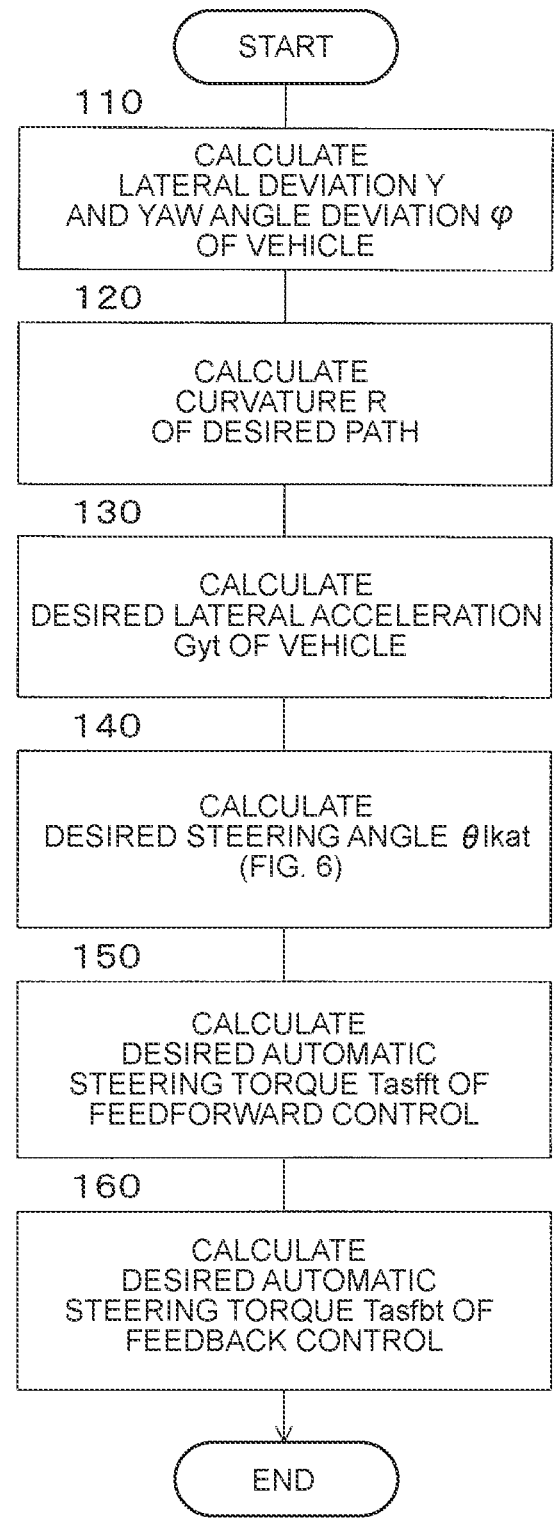
FIG. 4 is a flowchart of a calculation control routine for calculating desired automatic steering torque Tasfft of feedforward control and desired automatic steering torque Tasfbt of feedback control in lane keeping assist (LKA) control of the first embodiment.

The driving control device 18 calculates the desired steering angle θlkat according to the flowchart of FIG. 4. The desired steering angle θlkat is a steering angle for causing the vehicle to travel along the desired path. The desired steering angle θlkat is a desired index value of the steering angle of the right and left front wheels 20FR, 20FL for causing the vehicle to travel along the desired path to control the traveling state of the vehicle to a desired traveling state. The driving control device 18 calculates desired automatic steering torque Tasfft of feedforward control and desired automatic steering torque Tasfbt of feedback control that are torques for controlling the steering angle θ to the desired steering angle θlkat. The driving control device 18 outputs signals indicating these torques to the EPS control device 14.

As can be seen from the above description, the driving control device 18 and the EPS control device 14 cooperate to perform the LKA control to cause the vehicle to travel along the desired path. The driving control device 18 and the EPS control device 14 thus provide driver assistance. In the LKA control, the vehicle's lane is specified based on the information of the image of the area ahead of the vehicle captured by the CCD camera 60, and the desired path is set as a desired course passing through the center of the vehicle's lane. However, the desired path may be a line passing through a position other than the center of the vehicle's lane or may be a path that restrains the vehicle from moving out of its lane. In the driver assistance, the driving and braking force of the vehicle may be automatically controlled as needed.

Figure 3:
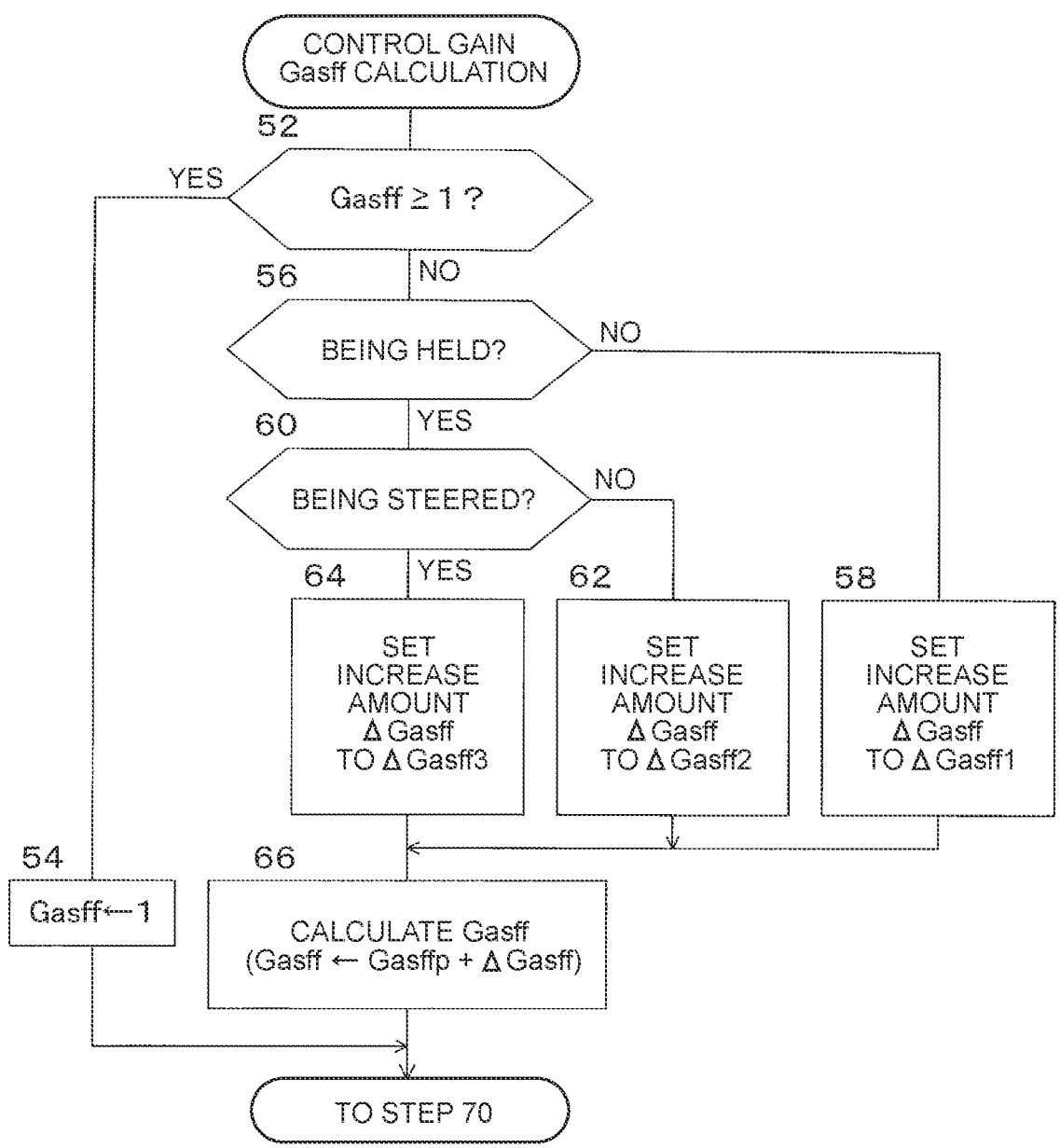
FIG. 3 is a flowchart of a control gain Gasff calculation control routine that is executed in step 50 of the flowchart of FIG. 2; P

Especially in the first embodiment, the EPS control device 14 variably sets control gain Gasff of the desired automatic steering torque Tasfft of the feedforward control by variably setting an increase amount ΔGasff in control gain Gasff according to the flowchart of FIG. 3. As will be described in detail later, the increase amount ΔGasff is set to the largest value ΔGasff1 when the driver is not holding the steering wheel 22, and is set to the smallest value ΔGasff3 when the driver is holding and steering the steering wheel 22. The increase amount ΔGasff is set to ΔGasff2 when the driver is holding but not steering the steering wheel 22. The value ΔGasff2 is larger than ΔGasff3 smaller than ΔGasff1. The values ΔGasff1 to ΔGasff3 are very small positive constants.

The control gain Gasff is calculated by the following equation (1), where Gasffp represents the previous value of the control gain Gasff. As the control gain Gasff is incremented by the increase amount ΔGasff in each control cycle, the control gain Gasff is gradually increased until it becomes 1.

$$Gasff = Gasffp + \Delta Gasff \tag{1}$$

Steering Assist Torque Control

Figure 5:
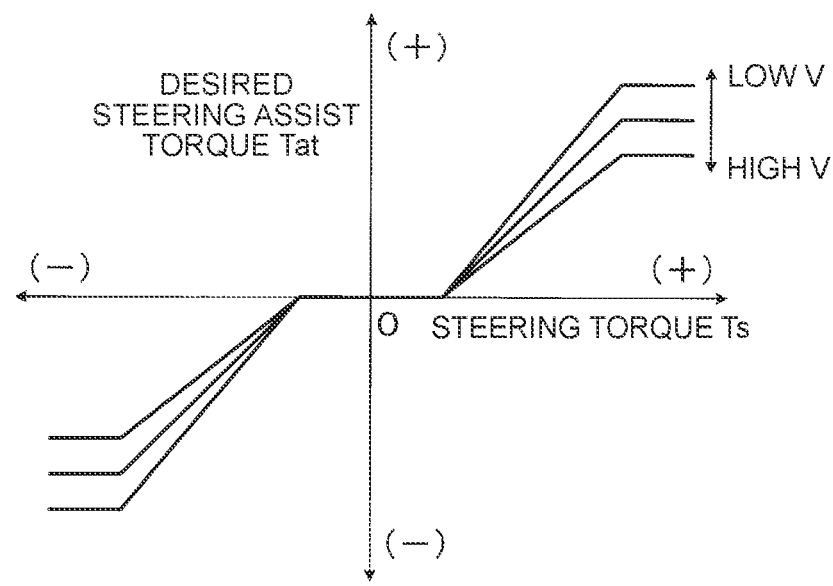
FIG. 5 is a map for calculating desired steering assist torque Tat based on steering torque Ts and a vehicle speed V.

Next, a steering assist torque control routine according to the embodiment will be described with reference to the flowchart of FIG. 2. The control routine according to the flowchart of FIG. 2 and a map shown in FIG. 5 are stored in the ROM of the EPS control device 14. The steering assist torque control is repeatedly performed at predetermined time intervals by the CPU of the EPS control device 14 when an ignition switch, not shown, is on.

First, in step 10, the desired steering assist torque Tat, which is desired steering assist torque for reducing the steering burden on the driver, is calculated based on the steering torque Ts and the vehicle speed V by referring to the map shown in FIG. 5. As shown in FIG. 5, the larger the absolute value of the steering torque Ts, the larger the absolute value of the calculated desired steering assist torque Tat, and the lower the vehicle speed V, the larger the absolute value of the calculated desired steering assist torque Tat.

The desired steering assist torque Tat may be calculated by any method known in the art. For example, the desired steering assist torque Tat may be calculated as the sum of desired basic steering assist torque Tab calculated based on the steering torque Ts and the vehicle speed V as described above and desired damping compensation torque and/or desired friction compensation torque.

In step 20, whether the steering mode is the automatic steering mode is determined by determining whether the mode switch 58 is on. When it is determined that the steering mode is the automatic steering mode (Yes in step 20), the steering assist torque control routine proceeds to step 40. When it is determined that the steering mode is not the automatic steering mode (No in step 20), the desired automatic steering torques Tasfft and Tasfbt are set to zero in step 30, and the steering assist torque control routine then proceeds to step 70.

In step 40, signals indicating the desired automatic steering torque Tasfft of the feedforward control and the desired automatic steering torque Tasfbt of the feedback control calculated as controlled variables for controlling the steering angle θ to the desired steering angle θlkat are read by the driving control device 18.

In step 50, the control gain Gasff of the desired automatic steering torque Tasfft of the feedforward control is calculated so as to gradually increase according to the flowchart of FIG. 3. As will be described in detail later, the gradual increase is variably set according to whether the driver is holding the steering wheel 22 and whether the driver is steering the steering wheel 22.

In step 70, the final desired steering assist torque Tatf is calculated as the sum of the desired steering assist torque Tat and the desired automatic steering torque Tast of the LKA control by the following equation (2). The desired automatic steering torque Tast is the sum of the product Gasff·Tasfft of the control gain Gasff and the desired automatic steering torque Tasfft of the feedforward control and the desired automatic steering torque Tasfbt of the feedback control.

$$Tatf = Tat + Tast = Tat + Gasff \cdot Tasfft + Tasfbt \tag{2}$$

In step 80, the EPS system 12 is controlled based on the final desired steering assist torque Tatf so that the steering assist torque Ta of the EPS system 12 becomes the final desired steering assist torque Tatf. Accordingly, when the steering mode is the automatic steering mode and the desired automatic steering torque of the LKA control is not zero, the steering angle of the front wheels 20FR, 20FL is controlled to a steering angle corresponding to the desired steering angle θlkat of the LKA control.

Calculation of Control Gain Gasff

Next, a control gain Gasff calculation control routine that is executed in step 50 will be described with reference to the flowchart of FIG. 3.

First, whether the control gain Gasff is 1 or larger is determined in step 52. When it is determined that the control gain Gasff is not 1 or larger (No in step 52), the control gain Gasff calculation control routine proceeds to step 56. When it is determined that the control gain Gasff is 1 or larger (Yes in step 52), the control gain Gasff is set to 1 in step 54, and the control gain Gasff calculation control routine then proceeds to step 70.

In step 56, whether the driver is holding the steering wheel 22 is determined by determining whether the following condition (A) is satisfied. When it is determined that the driver is holding the steering wheel 22 (Yes in step 56), the control gain Gasff calculation control routine proceeds to step 60. When it is determined that the driver is not holding the steering wheel 22 (No in step 56), the increase amount ΔGasff in control gain Gasff of the desired automatic steering torque Tasfft of the feedforward control is set to the largest value ΔGasff1 in step 58. The value ΔGasff1 and the values ΔGasff2, ΔGasff3 that will be described later are positive constants.

The condition (A) is as follows. However, it may be determined that the driver is holding the steering wheel 22 when the condition (B) or (C) is satisfied.

(A) A hold signal has been received from the touch sensor 56.

(B) The absolute value of the steering torque Ts is equal to or larger than a reference value Tst (positive constant) for determining whether the driver is holding the steering wheel 22.

(C) A hold signal has been received from the touch sensor 56, and the absolute value of the steering torque Ts is equal to or larger than the reference value Tst for determining whether the driver is holding the steering wheel 22.

In step 60, whether the driver is steering the steering wheel 22 is determined by determining whether the absolute value of the steering torque Ts is equal to or larger than a reference value Tso (positive constant larger than Tst) for determining whether the driver is steering the steering wheel 22. When it is determined that the driver is not steering the steering wheel 22 (No in step 60), the increase amount ΔGasff in control gain Gasff is set to the intermediate value ΔGasff2 in step 62. When it is determined that the driver is steering the steering wheel 22 (Yes in step 60), the increase amount ΔGasff in control gain Gasff is set to the smallest value ΔGasff3 in step 64.

When step 58, 62, or 64 is completed, the control gain Gasff calculation control routine proceeds to step 66. In step 66, the control gain Gasff is calculated by the above equation (1), where Gasffp represents the previous value of the control gain Gasff. The control gain Gasff calculation control routine then proceeds to step 70.

Calculation of Automatic Steering Torques Tasfft and Tasfbt in LKA Control

Figure 6:
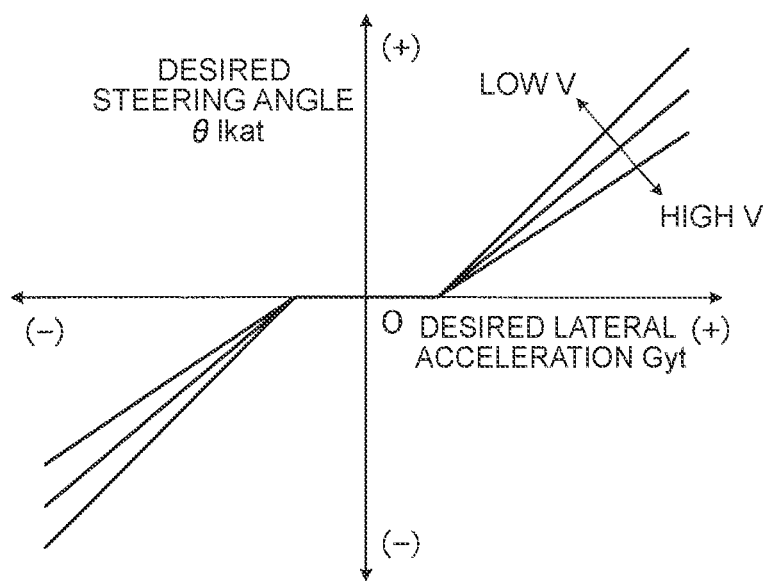
FIG. 6 is a map for calculating a desired steering angle θlkat of the LKA control based on desired lateral acceleration Gyt and the vehicle speed V of a vehicle.

Next, a calculation control routine for calculating the desired automatic steering torque Tasfft of the feedforward control and the desired automatic steering torque Tasfbt of the feedback control will be described with reference to the flowchart of FIG. 4. This calculation control routine is executed by the CPU of the driving control device 18. The calculation control routine according to the flowchart of FIG. 4 and a map shown in FIG. 6 are stored in the ROM of the driving control device 18. The calculation control for calculating the desired automatic steering torques Tasfft and Tasfbt is repeatedly performed at predetermined time intervals by the CPU of the driving control device 18 when the ignition switch, not shown, is on.

First, in step 110, a desired path along the traveling path is determined for the vehicle by analyzing the information of the image of the area ahead of the vehicle 16 captured by the CCD camera 60. A lateral deviation Y and a yaw angle deviation φ are also calculated. The lateral deviation Y is the lateral deviation of the vehicle 16 from the desired path, and the yaw angle deviation φ is the angle of the longitudinal direction of the vehicle 16 with respect to the desired path. In the embodiment, both a desired value of the lateral position of the vehicle 16 from the desired path and a desired value of the angle of the longitudinal direction of the vehicle 16 with respect to the desired path are zero. However, either or both of these desired values may not be zero.

The desired path of the vehicle 16 may be determined based on information from a navigation system, not shown, or may be determined based on combination of the analysis of the image information and the information from the navigation system. The lateral deviation Y and the yaw angle deviation φ are parameters that are necessary to perform the path control in which the vehicle is caused to travel along the desired path. However, since the method for calculating these parameters does not constitute the subject matter of the disclosure, these parameters may be calculated by any method.

In step 120, the curvature R (the reciprocal of the radius) of the desired path is calculated by a method known in the art.

In step 130, desired lateral acceleration Gyt is calculated based on the lateral deviation Y, the yaw angle deviation φ, and the curvature R. The desired lateral acceleration Gyt is calculated as a desired turning state quantity of the vehicle that is necessary to cause the vehicle 16 to travel along the desired path. The desired lateral acceleration Gyt may be calculated as a function of the lateral deviation Y, the yaw angle deviation φ, and the curvature R. Alternatively, a map indicating the relationship between the lateral deviation Y, yaw angle deviation φ, and curvature R and the desired lateral acceleration Gyt may be set, and the desired lateral acceleration Gyt may be calculated from the map.

In step 140, the desired steering angle θlkat of the path control is calculated based on the desired lateral acceleration Gyt and the vehicle speed V of the vehicle by referring to the map shown in FIG. 6. As shown in FIG. 6, the larger the absolute value of the desired lateral acceleration Gyt, the larger the magnitude of the calculated desired steering angle θlkat, and the higher the vehicle speed V, the smaller the magnitude of the calculated desired steering angle θlkat.

In step 150, the desired automatic steering torque Tasfft of the feedforward control that is necessary to control the steering angle θ to the desired steering angle θlkat is calculated by a method known in the art.

In step 160, the desired automatic steering torque Tasfft of the feedback control that is necessary to control the steering angle θ to the desired steering angle θlkat is calculated based on the deviation θlkat−θ between the desired steering angle θlkat and the steering angle θ by a method known in the art.

Second Embodiment

Figure 7:
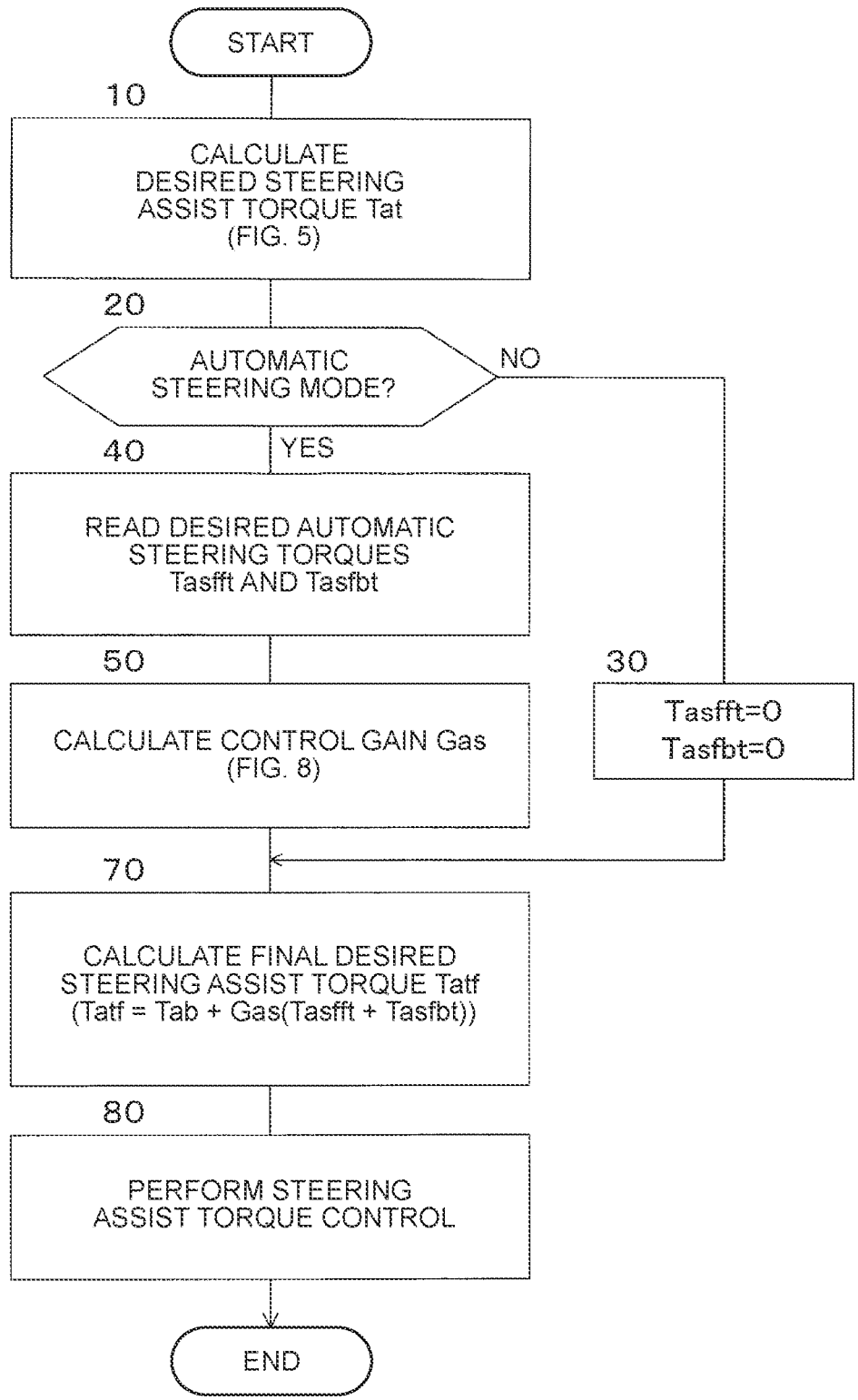
FIG. 7 is a flowchart of a steering assist torque control routine in a second embodiment.

FIG. 7 is a flowchart of a steering assist torque control routine in the vehicle driver assistance system 10 according to a second embodiment of the disclosure. In FIG. 7, the steps that are the same as or similar to those of FIG. 2 are denoted with the same step numbers as those of FIG. 2. The second embodiment is configured similar to the first embodiment except for the points that will be described below.

Figure 8:
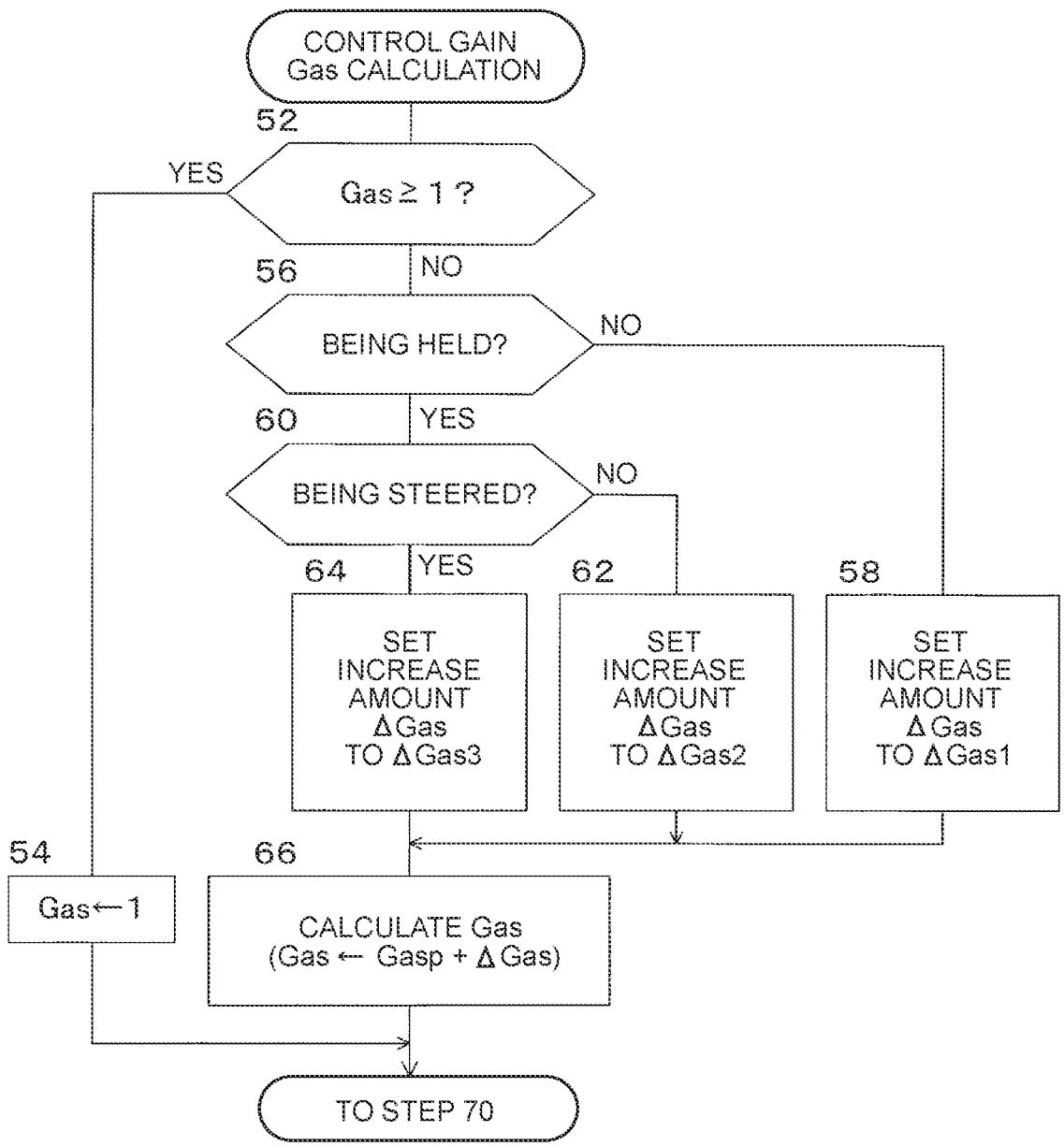
FIG. 8 is a flowchart of a control gain Gasff calculation control routine that is executed in step 50 of the flowchart of FIG. 7.

In the second embodiment, in step 50, control gain Gas of desired automatic steering torque Tast is calculated so as to gradually increase according to the flowchart of FIG. 8. In step 50 of the second embodiment as well, the gradual increase is variably set according to whether the driver is holding the steering wheel 22 and whether the driver is steering the steering wheel 22.

In step 70, the final desired steering assist torque Tatf is calculated as the sum of the desired steering assist torque Tat and the product Gas·Tast of the control gain Gas and the desired automatic steering torque Tast of the LKA control by the following equation (3). The desired automatic steering torque Tast is the sum, Tasfft+Tasfbt, of the desired automatic steering torque Tasfft of the feedforward control and the desired automatic steering torque Tasfbt of the feedback control.

$$Tatf=Tat+Gas \cdot Tast=Tat+Gas(Tasfft+Tasfbt) \qquad (3)$$

As described above, the control gain Gas is calculated according to the flowchart of FIG. 8. In FIG. 8, the steps that are the same as or similar to those of FIG. 3 are denoted with the same step numbers as those of FIG. 3.

Whether the control gain Gas is 1 or larger is determined in step 52. When it is determined that the control gain Gas is not 1 or larger (No in step 52), the control gain Gas calculation control routine proceeds to step 56. When it is determined that the control gain Gas is 1 or larger (Yes in step 52), the control gain Gas is set to 1 in step 54, and the control gain Gas calculation control routine then proceeds to step 70.

In steps 58, 62, and 64, an increase amount ΔGas in control gain Gas is set to the largest value ΔGas1, an intermediate value ΔGas2, and the smallest value ΔGas3, respectively. The values ΔGas1, ΔGas2, and ΔGas3 are positive constants.

In step 66, the control gain Gas is calculated by the following equation (4), where Gasp represents the previous value of the control gain Gas.

$$Gas=Gasp+\Delta Gas \qquad (4)$$

As can be seen from the above description, according to the first and second embodiments, the rate of change in desired automatic steering torque Tast when the steering mode switches from the manual steering mode to the automatic steering mode is smaller in the situation where it is determined that the driver is holding the steering wheel 22 than in other situations. Accordingly, the rate of change in steering assist torque Tat when the steering mode switches from the manual steering mode to the automatic steering mode is smaller when the driver is holding the steering wheel 22 than when the driver is not holding the steering wheel 22. Since the change in steering torque Ts the driver feels through the steering wheel 22 is gentle, discomfort the driver feels due to a sudden change in steering torque when the steering mode switches from the manual steering mode to the automatic steering mode can be reduced.

The rate of change in desired automatic steering torque Tast when the steering mode switches from the manual steering mode to the automatic steering mode does not decrease when the driver is not holding the steering wheel 22. Since the rate of change in steering assist torque Tat therefore does not decrease when the driver is not holding the steering wheel 22, the index value θ of the steering angle of the front wheels 20FR, 20FL that are the steered wheels can be quickly controlled to the desired index value θlkat. Accordingly, the path control as the automatic steering control can be effectively performed, and the traveling state of the vehicle can be quickly controlled to the desired traveling state.

Figure 9:
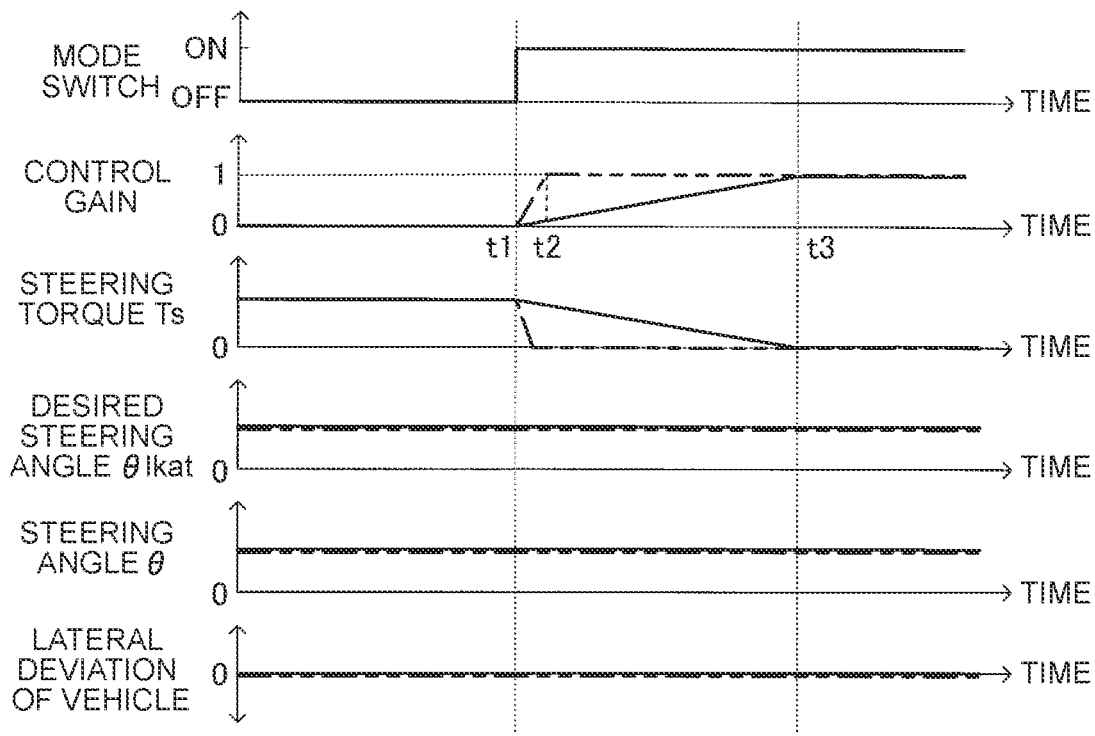
FIG. 9 shows the rates of change in desired automatic steering torque Tast etc. when the steering mode switches from a manual steering mode to an automatic steering mode in a situation where the driver is holding a steering wheel.

FIG. 9 shows the rates of change in desired automatic steering torque Tast etc. when the steering mode switches from the manual steering mode to the automatic steering mode in the situation where the driver is holding the steering wheel. As shown in FIG. 9, it is herein assumed that the steering mode switches from the manual steering mode to the automatic steering mode when the mode switch 58 is switched from on to off at time t1. It is also assumed that the vehicle is turning at a certain desired steering angle θlkat. The same applies to FIG. 10 that will be described later.

In the conventional driver assistance system, as shown by long dashed double-short dashed lines in FIG. 9, the control gain of the automatic steering starts increasing sharply at time t1 and reaches 1 at, e.g., time t2 close to time t1. Although not shown in the figure, since the automatic steering torque increases sharply, the steering torque Ts decreases sharply. It is therefore inevitable that the driver feels discomfort due to the sharp decrease in steering torque Ts.

According to the first and second embodiments, on the other hand, as shown by continuous lines in FIG. 9, the control gain of the automatic steering starts increasing gradually at time t1 and reaches 1 at, e.g., time t3 far from time t1. Although not shown in the figure, since the automatic steering torque increases gradually, the steering torque Ts decreases gradually. This configuration can avoid the driver feeling discomfort due to the sharp decrease in steering torque Ts.

Figure 10:
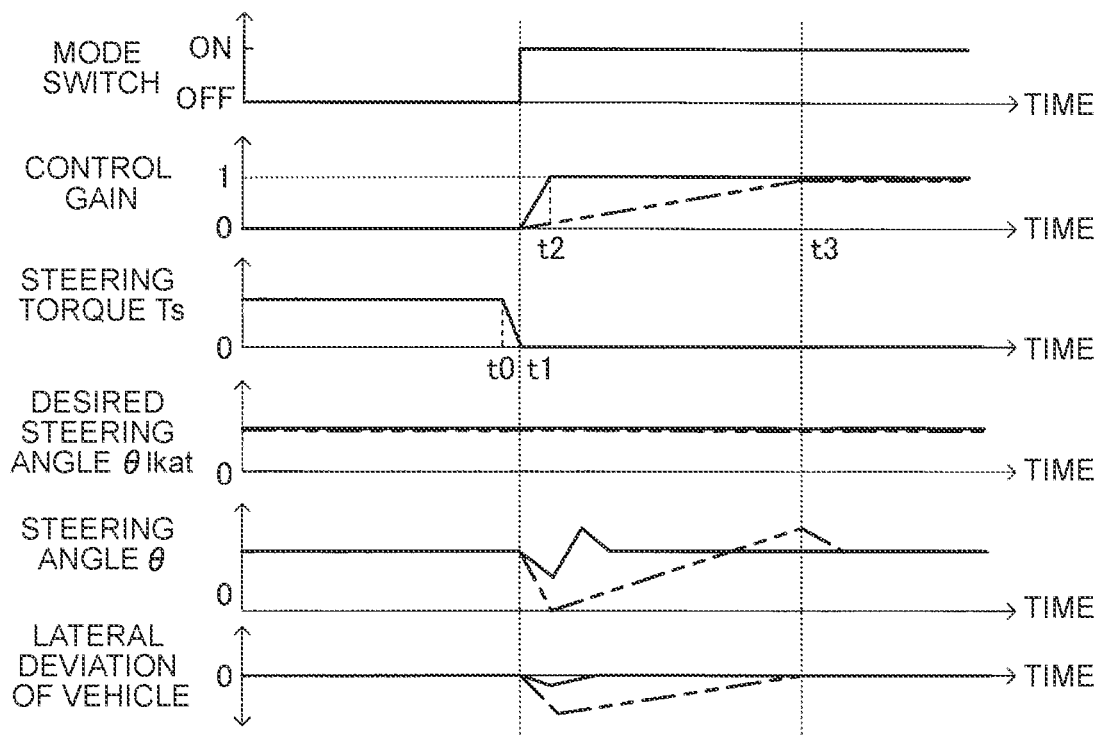
FIG. 10 shows the rates of change in desired automatic steering torque Tast etc. when the steering mode switches from the manual steering mode to the automatic steering mode in a situation where the driver is not holding the steering wheel.

FIG. 10 shows the rates of change in desired automatic steering torque Tast etc. when the steering mode switches from the manual steering mode to the automatic steering mode in the situation where the driver is not holding the steering wheel. It is herein assumed that the driver releases the steering wheel 22 and the steering torque Ts decreases at time t0 before time t1, and the steering torque Ts becomes 0 at or before time t1.

As shown by long dashed double-short dashed line in FIG. 10, as the control gain of the automatic steering starts increasing gradually at time t1 as in FIG. 9, the vehicle moves toward the outside of the turn with respect to the desired path due to insufficient automatic steering torque, and therefore the lateral deviation of the vehicle increases. Since the path control is performed to deal with this, the desired steering angle θlkat also fluctuates significantly, and it is inevitable that the behavior of the vehicle is disturbed.

According to the first and second embodiments, on the other hand, the rate of change in control gain of the automatic steering does not decrease when the driver is not holding the steering wheel 22. As shown by continuous lines in FIG. 10, the control gain of the automatic steering starts increasing rapidly at time t1 and reaches 1 at, e.g., time t2 close to time t1. This configuration can avoid an increase in lateral deviation of the vehicle due to insufficient automatic steering torque and can avoid significant fluctuations in desired steering angle θlkat. This configuration can thus avoid disturbance of the behavior of the vehicle.

In the first and second embodiments, in the case whether the driver is holding the steering wheel 22 is determined based on the above condition (A), whether the driver is holding the steering wheel 22 can be easily determined by determining whether a hold signal has been output from the touch sensor 56.

In the first and second embodiments, in the case where whether the driver is holding the steering wheel 22 is determined based on the above condition (B), whether the driver is holding the steering wheel 22 can be determined using the steering torque Ts for calculating the desired steering assist torque Tat. This configuration eliminates the need for special sensor such as a touch sensor that detects that the driver is holding the steering wheel.

In the first and second embodiments, in the case where whether the driver is holding the steering wheel 22 is determined based on the above condition (C), the determination accuracy can be improved as compared to the case where whether the driver is holding the steering wheel 22 is determined based on the above condition (A) or (B).

According to the first and second embodiments, in the calculation of the control gain Gasff (FIG. 3) and the control gain Gas (FIG. 8), whether the driver is steering the steering wheel 22 is determined in step 60, and the increase in control gain (ΔGasff, ΔGas) is changed according to the determination result. When the magnitude of the steering torque Ts is equal to or larger than the reference value Tso for determining whether the driver is steering the steering wheel 22, the increase in control gain is made smaller and the rate of change in desired automatic steering torque (Tast) is thus made lower than when the magnitude of the steering torque Ts is smaller than the reference value Tso.

Accordingly, when the magnitude of the steering torque is equal to or larger than the reference value for determining whether the driver is steering the steering wheel 22 and the driver tends to feel a sudden change in steering torque, the degree of change in desired automatic steering torque can be made smaller than when the magnitude of the steering torque is smaller than the reference value for determining whether the driver is steering the steering wheel 22. This configuration can effectively reduce the possibility of the driver feeling discomfort due to a sudden change in steering torque when the driver is holding the steering wheel 22 firmly, and can also reduce the possibility of the degree of change in desired automatic steering torque being excessively reduced when the driver is not holding the steering wheel 22 firmly.

Especially according to the first embodiment, the desired automatic steering torque Tast is the sum, Tasff+Tasfb, of the desired automatic steering torque Tasff of the feedforward control and the desired automatic steering torque Tasfb of the feedback control that are torques for controlling the index value θ of the steering angle of the front wheels 20FR, 20FL to the desired index value θalkt. However, only the rate of change in desired automatic steering torque Tasff of the feedforward control is reduced, and the rate of change in desired automatic steering torque Tasff of the feedback control is not reduced. Accordingly, the steering angle of the front wheels can be accurately controlled to the desired steering angle while reducing the possibility of the driver feeling discomfort due to an increase in desired automatic steering torque of the feedforward control when the steering mode switches from the manual steering mode to the automatic steering mode.

According to the second embodiment, the desired automatic steering torque Tast is the sum, Tasff+Tasfb, of the desired automatic steering torque Tasff of the feedforward control and the desired automatic steering torque Tasfb of the feedback control that are torques for controlling the index value θ of the steering angle of the front wheels 20FR, 20FL to the desired index value θalkt. Moreover, the rate of change in desired automatic steering torque Tast, that is, the rate of change in sum of the desired automatic steering torque Tasff of the feedforward control and the desired automatic steering torque Tasfb of the feedback control, is reduced. Accordingly, the possibility of the driver feeling discomfort can be effectively reduced even in the case where the difference between the index value of the steering angle of the front wheels and the desired index value is large and the desired automatic steering torque of the feedback control is large when the steering mode switches from the manual steering mode to the automatic steering mode.

First Modification

Figure 11:
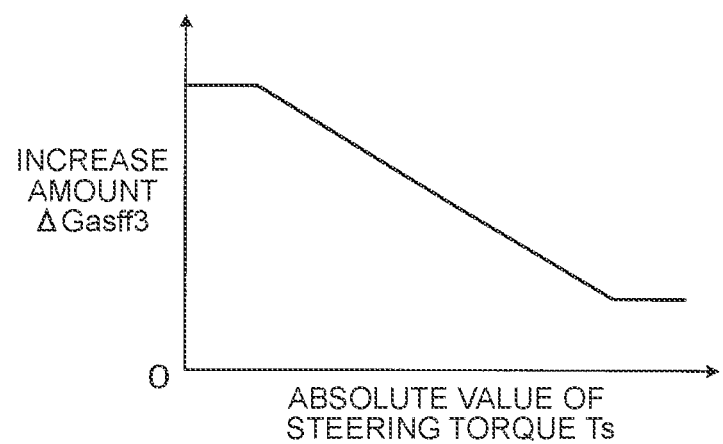
FIG. 11 is a map for calculating an increase amount ΔGasff3 in control gain Gasff based on the absolute value of steering torque Ts.

A first modification is a modification of the first embodiment. In the first modification, although not shown in the figures, the control other than step 64 is performed in a manner similar to that of the first embodiment. In step 64, the increase amount ΔGasff3 is calculated based on the absolute value of the steering torque Ts by referring to a map shown in FIG. 11, and the increase amount ΔGasff in control gain Gasff is set to the calculated value ΔGasff3. As shown in FIG. 11, the larger the absolute value of the steering torque Ts, the smaller the calculated increase amount ΔGasff3. The increase amount ΔGasff3 is smaller than the increase amount ΔGasff2.

According to the first modification, when the driver is holding and steering the steering wheel 22, the increase amount ΔGasff3 can be variably set within the range smaller than the increase amount ΔGasff2 so that the increase amount ΔGasff3 decreases as the absolute value of the steering torque Ts increases. Accordingly, the rate of change in control gain Gasff can be variably set according to the magnitude of the steering torque so that the rate of change in control gain Gasff decreases as the absolute value of the steering torque Ts increases. The rate of change in desired automatic steering torque can thus be variably set.

Second Modification

Figure 12:
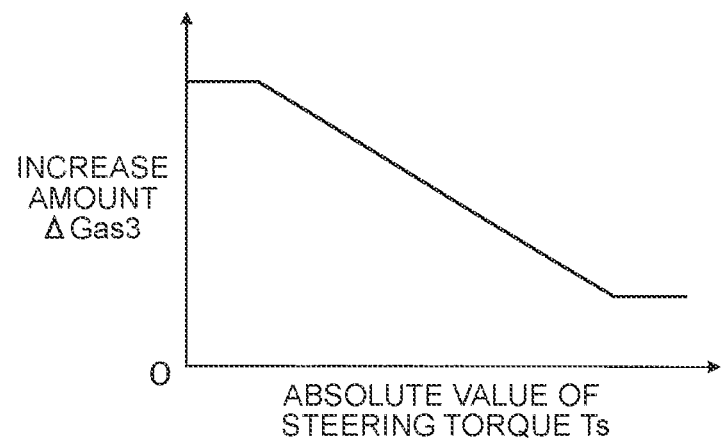
FIG. 12 is a map for calculating an increase amount ΔGas3 in control gain Gas based on the absolute value of the steering torque Ts.

A second modification is a modification of the second embodiment. In the second modification, although not shown in the figures, the control other than step 64 is performed in a manner similar to that of the second embodiment. In step 64, the increase amount ΔGas3 is calculated based on the absolute value of the steering torque Ts by referring to a map shown in FIG. 12, and the increase amount ΔGas in control gain Gas is set to the calculated value ΔGas3. As shown in FIG. 12, like the increase amount ΔGasff3 in the first modification, the larger the absolute value of the steering torque Ts, the smaller the calculated increase amount ΔGas3. The increase amount ΔGas3 is smaller than the increase amount ΔGas2.

According to the second modification, when the driver is holding and steering the steering wheel 22, the increase amount ΔGas3 can be variably set within the range smaller than the increase amount ΔGas2 so that the increase amount ΔGas3 decreases as the absolute value of the steering torque Ts increases. Accordingly, the rate of change in control gain Gas can be variably set according to the magnitude of the steering torque so that the rate of change in control gain Gas decreases as the absolute value of the steering torque Ts increases. The rate of change in desired automatic steering torque can thus be variably set.

According to the first and second modifications, the larger the absolute value of the steering torque Ts, in other words, the higher the possibility of the driver feeling discomfort due to a sudden change in steering torque, the higher the extent to which the rate of change in steering torque is reduced, and the more effectively the possibility of the driver feeling discomfort can be reduced. Accordingly, the possibility of the driver feeling discomfort due to a sudden change in steering torque can be more suitably reduced than in the first and second embodiments in which the extent to which the rate of change in steering torque is reduced is the same regardless of the magnitude of the steering torque.

Third Modification

Figure 13:
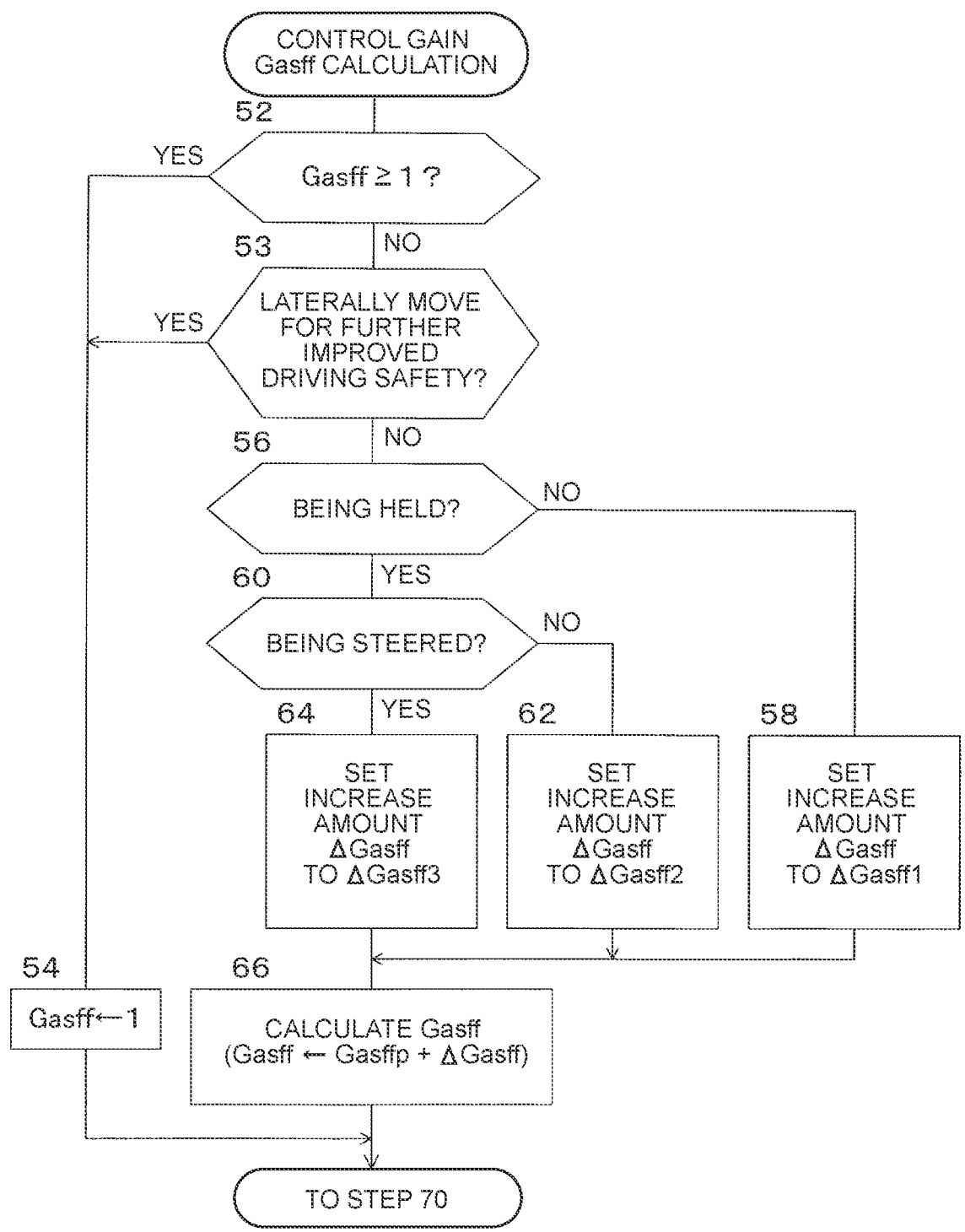
FIG. 13 is a flowchart of a control gain Gasff calculation control routine in a third modification.

A third modification is a modification of the first embodiment. In the third modification, as shown in FIG. 13, step 53 is performed after step 52. In step 53, it is determined whether the desired index value θalkt is the desired index value for moving the vehicle 16 in the lateral direction in order to further improve the driving safety of the vehicle 16. When it is determined that the desired index value θalkt is not the desired index value for moving the vehicle in the lateral direction (No in step 53), the control gain Gasff calculation control routine proceeds to step 56. When it is determined that the desired index value θalkt is the desired index value for moving the vehicle in the lateral direction (Yes in step 53), the control gain Gasff is set to 1 in step 54, and the control gain Gasff calculation control routine then proceeds to step 70. For example, moving the vehicle 16 in the lateral direction in order to further improve the driving safety of the vehicle 16 may be returning the vehicle 16 to the center of its lane, increasing the lateral interval from the vehicle 16 to a vehicle traveling in the adjacent lane, etc. The same applies to a fourth modification described below.

Fourth Modification

Figure 14:
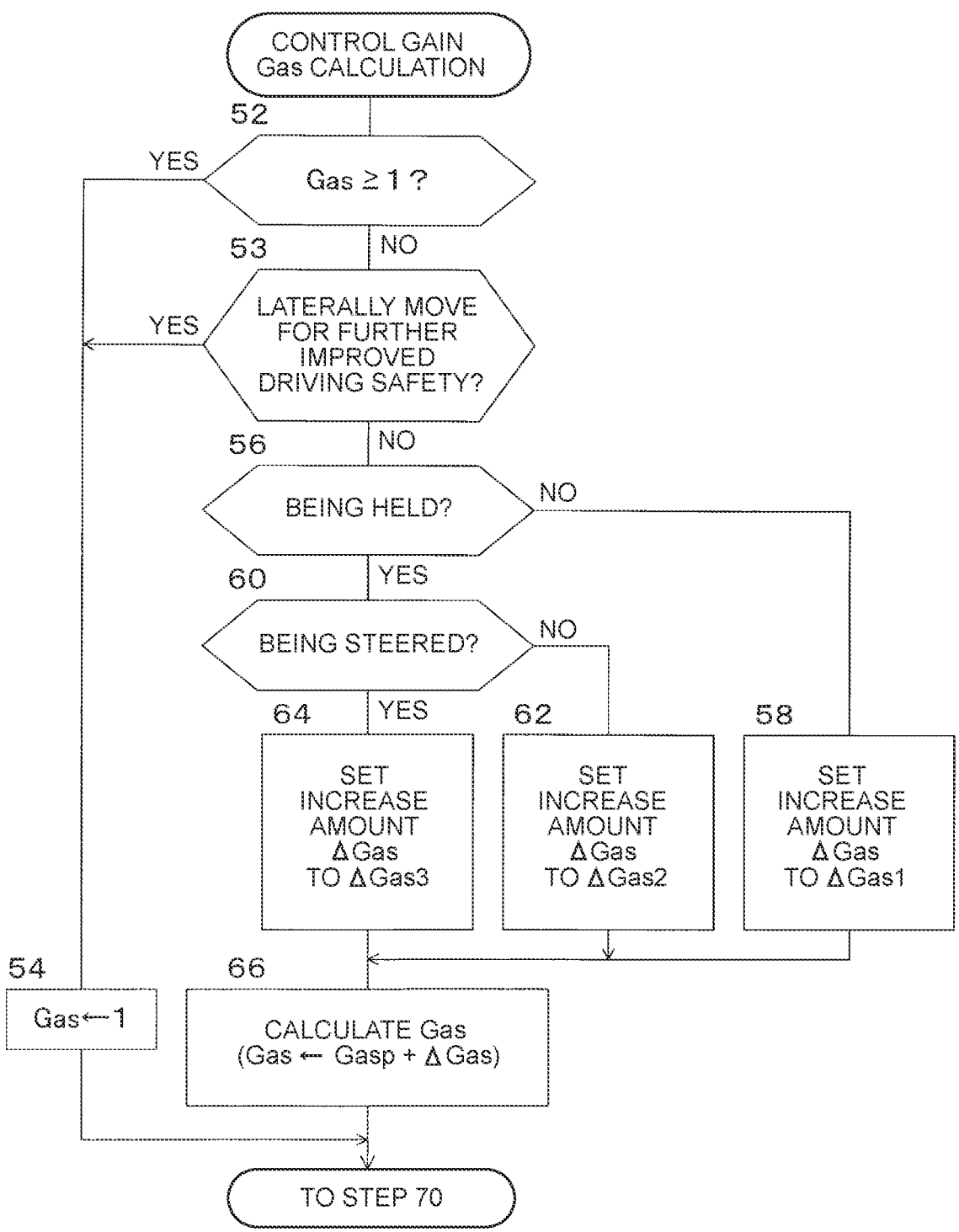
FIG. 14 is a flowchart of a control gain Gas calculation control routine in a fourth modification.

A fourth modification is a modification of the second embodiment. In the fourth modification, as shown in FIG. 14, step 53 is performed after step 52. In step 53, it is determined whether the desired index value θalkt is the desired index value for moving the vehicle 16 in the lateral direction in order to further improve the driving safety of the vehicle 16. When it is determined that the desired index value θalkt is not the desired index value for moving the vehicle in the lateral direction (No in step 53), the control gain Gas calculation control routine proceeds to step 56. When it is determined that the desired index value θalkt is the desired index value for moving the vehicle in the lateral direction (Yes in step 53), the control gain Gas is set to 1 in step 54, and the control gain Gas calculation control routine then proceeds to step 70.

According to the third and fourth modifications, the rate of change in desired automatic steering torque Tast is not reduced when the desired index value θalkt of the steering angle is the desired index value of the steering angle for moving the vehicle 16 in the lateral direction in order to further improve the driving safety of the vehicle 16. The steering angle of the front wheels can thus be more quickly controlled to the desired index value than in the first and second embodiments. Accordingly, the vehicle can be quickly moved in the lateral direction, and the driving safety of the vehicle can further be improved quickly.

Although the disclosure is described in detail above based on the specific embodiments, it should be apparent to those skilled in that art that the disclosure is not limited to the above embodiments and various other embodiments are possible within the scope of the disclosure.

For example, in the above embodiments and modifications, the index value of the steering angle of the right and left front wheels 20FR, 20FL that are the steered wheels is the steering angle θ. However, the index value of the steering angle of the right and left front wheels 20FR, 20FL may be a value other than the steering angle θ such as the amount of movement of the rack bar 24 with respect to the housing 40, as long as the value is an index of the steering angle.

In the above embodiments and modifications, the automatic steering of the steered wheels in the automatic steering mode is the LKA control in which the vehicle is caused to travel along the desired path (desired traveling path). However, the automatic steering of the steered wheels in the automatic steering mode may be any automatic steering known in the art.

The first and second modifications are different from the third and fourth modifications, respectively. However, the first and second modifications may be combined with the third and fourth modifications, respectively.

According to the disclosure, a vehicle driver assistance system (10) includes: a steering assist torque generation device (EPS device) (12) configured to generate steering assist torque (Ta); a control device (EPS control device, driving control device) (14, 18) configured to control the steering assist torque generation device; and a switch (58) configured to switch a steering mode between a manual steering mode and an automatic steering mode, the manual steering mode being a mode in which a steered wheel (20FR, 20FL) is steered as a driver operates a steering wheel (22), and the automatic steering mode being a mode in which the steered wheel is steered by the steering assist torque generated by the steering assist torque generation device.

The control device (14, 18) is configured to acquire information on steering torque (Ts), and is configured to calculate desired steering assist torque (Tat) based on the steering torque, the desired steering assist torque (Tat) being torque that reduces a burden of the operation of the steering wheel on the driver. The control device (14, 18) is configured to control the steering assist torque generation device (12) so as to control the steering assist torque (Ta) to the desired steering assist torque (Tat) when the steering mode is the manual steering mode. The control device (14, 18) is configured to calculate a desired index value (θalkt) of a steering angle of the steered wheel and desired automatic steering torque (Tast) and control the steering assist torque generation device so as to control the steering assist torque to a sum (Tat+Tast) of the desired automatic steering torque and the desired steering assist torque when the steering mode is the automatic steering mode, the desired index value (θalkt) of the steering angle of the steered wheel being a value for controlling a traveling state of a vehicle (16) to a desired traveling state, and the desired automatic steering torque (Tast) being torque for controlling an index value (θ) of the steering angle of the steered wheel to the desired index value (θalkt).

The control device (14, 18) is configured to determine whether the driver is holding the steering wheel (22). The control device (14, 18) is configured to calculate the desired automatic steering torque so as to make a rate of change in the desired automatic steering torque (Tast) lower when the steering mode switches from the manual steering mode to the automatic steering mode in a situation where it is determined that the driver is holding the steering wheel than when the steering mode switches from the manual steering mode to the automatic steering mode in a situation where it is determined that the driver is not holding the steering wheel.

According to the above configuration, when the steering mode switches from the manual steering mode to the automatic steering mode in the situation where it is determined that the driver is holding the steering wheel, the rate of change in the desired automatic steering torque is smaller than when the steering mode switches from the manual steering mode to the automatic steering mode in the situation where it is determined that the driver is not holding the steering wheel. Accordingly, a rate of change in the steering assist torque when the steering mode switches from the manual steering mode to the automatic steering mode is smaller when the driver is holding the steering wheel than when the driver is not holding the steering wheel.

Since the change in steering torque the driver feels through the steering wheel is gentle, discomfort the driver feels due to a sudden change in steering torque when the steering mode switches from the manual steering mode to the automatic steering mode can be reduced.

The rate of change in the desired automatic steering torque when the steering mode switches from the manual steering mode to the automatic steering mode does not decrease when the driver is not holding the steering wheel. Since the rate of change in the steering assist torque therefore does not decrease when the driver is not holding the steering wheel, the index value of the steering angle of the steered wheel can be quickly controlled to the desired index value. Accordingly, the traveling state of the vehicle can be quickly controlled to the desired traveling state.

ASPECTS OF DISCLOSURE

In one aspect of the disclosure, the vehicle driver assistance system (10) further includes a touch sensor (56) configured to output a hold signal when the driver is holding the steering wheel (22). The control device (14, 18) is configured to determine that the driver is holding the steering wheel when the hold signal has been output from the touch sensor.

According to the above aspect, it is determined that the driver is holding the steering wheel when the hold signal has been output from the touch sensor. The control device can therefore determine whether the driver is holding the steering wheel by determining whether the hold signal has been output from the touch sensor.

In another aspect of the disclosure, the control device (14, 18) is configured to determine that the driver is holding the steering wheel (22) when magnitude of the steering torque (Ts) is equal to or larger than a reference value (Tst) for determining whether the driver is holding the steering wheel.

According to the above aspect, it is determined that the driver is holding the steering wheel when the magnitude of the steering torque is equal to or larger than the reference value for determining whether the driver is holding the steering wheel. Whether the driver is holding the steering wheel can therefore be determined using the steering torque for calculating the desired steering assist torque that reduces the burden of the operation of the steering wheel on the driver. This configuration eliminates the need for special sensor such as a touch sensor that detects that the driver is holding the steering wheel.

In still another aspect of the disclosure, the vehicle driver assistance system (10) further includes a touch sensor (56)

configured to output a hold signal when the driver is holding the steering wheel (22). The control device (14, 18) is configured to determine that the driver is holding the steering wheel when the hold signal has been output from the touch sensor and magnitude of the steering torque (Ts) is equal to or larger than a reference value (Tst) for determining whether the driver is holding the steering wheel.

According to the above aspect, it is determined that the driver is holding the steering wheel when the hold signal has been output from the touch sensor and the magnitude of the steering torque is equal to or larger than the reference value for determining whether the driver is holding the steering wheel. The determination accuracy can thus be improved as compared to the case where whether the driver is holding the steering wheel is determined based on either the hold signal from the touch sensor or the steering torque.

In yet another aspect of the disclosure, the control device (14, 18) is configured to make the rate of change in the desired automatic steering torque (Tast) lower when the magnitude of the steering torque (Ts) is equal to or larger than a reference value (Tso) for determining whether the driver is steering the steering wheel than when the magnitude of the steering torque is smaller than the reference value for determining whether the driver is steering the steering wheel, in the case where the steering mode switches from the manual steering mode to the automatic steering mode in the situation where it is determined that the driver is holding the steering wheel (22).

Typically, the more firmly the driver is holding the steering wheel, the larger the magnitude of the steering torque, and the more likely the driver is to feel discomfort due to a sudden change in the steering torque when the steering mode switches from the manual steering mode to the automatic steering mode.

According to the above aspect, when the magnitude of the steering torque is equal to or larger than the reference value for determining whether the driver is steering the steering wheel, the rate of change in the desired automatic steering torque is made lower than when the magnitude of the steering torque is smaller than the reference value for determining whether the driver is steering the steering wheel. Accordingly, when the magnitude of the steering torque is equal to or larger than the reference value for determining whether the driver is steering the steering wheel, the degree of change in the desired automatic steering torque can be made smaller than when the magnitude of the steering torque is smaller than the reference value for determining whether the driver is steering the steering wheel. This configuration can effectively reduce the possibility of the driver feeling discomfort due to a sudden change in the steering torque when the driver is holding the steering wheel firmly, and can also reduce the possibility of the degree of change in the desired automatic steering torque being excessively reduced when the driver is not holding the steering wheel firmly.

In a further aspect of the disclosure, the control device (14, 18) is configured to variably set the rate of change in the desired automatic steering torque (Tast) according to the magnitude of the steering torque in such a manner that the rate of change in the desired automatic steering torque (Tast) decreases as the magnitude of the steering torque (Ts) increases.

According to the above aspect, the rate of change in the desired automatic steering torque is variably set according to the magnitude of the steering torque in such a manner that the rate of change in the desired automatic steering torque decreases as the magnitude of the steering torque increases. Accordingly, the larger the magnitude of the steering torque, in other words, the higher the possibility of the driver feeling discomfort due to a sudden change in the steering torque, the higher the extent to which the rate of change in the steering torque is reduced, and the more effectively the possibility of the driver feeling discomfort can be reduced. Accordingly, the possibility of the driver feeling discomfort due to a sudden change in the steering torque can be more suitably reduced than in the case where the extent to which the rate of change in the steering torque is reduced is the same regardless of the magnitude of the steering torque.

In a still further aspect of the disclosure, the control device (14, 18) is configured not to reduce the rate of change in the desired automatic steering torque (Tast) when the desired index value (θalkt) of the steering angle of the steered wheel (20FR, 20FL) is a desired index value of the steering angle for moving the vehicle (16) in a lateral direction in order to further improve driving safety of the vehicle.

According to the above aspect, the rate of change in the desired automatic steering torque is not reduced when the desired index value of the steering angle of the steered wheel is the desired index value of the steering angle for moving the vehicle in the lateral direction in order to further improve the driving safety of the vehicle. Since the steering angle of the steered wheel can thus be quickly controlled to the desired index value, the vehicle can be quickly moved in the lateral direction and the driving safety of the vehicle can further be improved quickly.

In a yet further aspect of the disclosure, the desired automatic steering torque (Tast) is a sum (Tasff+Tasfb) of desired automatic steering torque (Tasff) of feedforward control and desired automatic steering torque (Tasfb) of feedback control that are torques for controlling the index value (θ) of the steering angle of the steered wheel (20FR, 20FL) to the desired index value (θalkt), and the control device (14, 18) is configured to reduce a rate of change in the desired automatic steering torque of the feedforward control.

According to the above aspect, only the rate of change in the desired automatic steering torque of the feedforward control is reduced, and the rate of change in the desired automatic steering torque of the feedback control is not reduced. Accordingly, the steering angle of the steered wheel can be accurately controlled to the desired steering angle while reducing the possibility of the driver feeling discomfort due to an increase in the desired automatic steering torque of the feedforward control when the steering mode switches from the manual steering mode to the automatic steering mode.

In a yet further aspect of the disclosure, the desired automatic steering torque (Tast) is a sum (Tasff+Tasfb) of desired automatic steering torque (Tasff) of feedforward control and desired automatic steering torque (Tasfb) of feedback control that are torques for controlling the index value (θ) of the steering angle of the steered wheel (20FR, 20FL) to the desired index value (θalkt), and the control device (14, 18) is configured to reduce a rate of change in the sum.

According to the above aspect, the rate of change in the sum of the desired automatic steering torque of the feedforward control and the desired automatic steering torque of the feedback control is reduced. Accordingly, the possibility of the driver feeling discomfort can be effectively reduced even in the case where the difference between the index value of the steering angle of the steered wheel and the desired index value is large and the desired automatic steering torque of the feedback control is large when the steering mode switches from the manual steering mode to the automatic steering mode.

In the above description, sings that are used in the embodiments are shown in parentheses in order to help understand the disclosure. However, the components of the disclosure are not limited to the components of the embodiments corresponding to the signs shown in parentheses.

What is claimed is:

1. A vehicle driver assistance system, comprising:
a steering assist torque generation device configured to generate steering assist torque;
a control device configured to control the steering assist torque generation device; and
a switch configured to switch a steering mode between a manual steering mode and an automatic steering mode, the manual steering mode being a mode in which a steered wheel is steered as a driver operates a steering wheel, and the automatic steering mode being a mode in which the steered wheel is steered by the steering assist torque generated by the steering assist torque generation device, wherein:
the control device is configured to acquire information on steering torque;
the control device is configured to calculate desired steering assist torque based on the steering torque, the desired steering assist torque being torque that reduces a burden of operation of the steering wheel on the driver;
the control device is configured to control the steering assist torque generation device so as to control the steering assist torque to the desired steering assist torque when the steering mode is the manual steering mode;
the control device is configured to calculate a desired index value of a steering angle of the steered wheel and desired automatic steering torque and control the steering assist torque generation device so as to control the steering assist torque to a sum of the desired automatic steering torque and the desired steering assist torque when the steering mode is the automatic steering mode, the desired index value of the steering angle of the steered wheel being a value for controlling a traveling state of a vehicle to a desired traveling state, and the desired automatic steering torque being torque for controlling an index value of the steering angle of the steered wheel to the desired index value;
the control device is configured to determine whether the driver is holding the steering wheel; and
the control device is configured to calculate the desired automatic steering torque so as to make a rate of change in the desired automatic steering torque lower when the steering mode switches from the manual steering mode to the automatic steering mode in a situation where determination is made that the driver is holding the steering wheel than when the steering mode switches from the manual steering mode to the automatic steering mode in a situation where determination is made that the driver is not holding the steering wheel.

2. The vehicle driver assistance system according to claim 1, further comprising a touch sensor configured to output a hold signal when the driver is holding the steering wheel, wherein the control device is configured to determine that the driver is holding the steering wheel when the hold signal has been output from the touch sensor.

3. The vehicle driver assistance system according to claim 1, wherein the control device is configured to determine that the driver is holding the steering wheel when a magnitude of the steering torque is equal to or larger than a reference value for determining whether the driver is holding the steering wheel.

4. The vehicle driver assistance system according to claim 1, further comprising a touch sensor configured to output a hold signal when the driver is holding the steering wheel, wherein the control device is configured to determine that the driver is holding the steering wheel when the hold signal has been output from the touch sensor and a magnitude of the steering torque is equal to or larger than a reference value for determining whether the driver is holding the steering wheel.

5. The vehicle driver assistance system according to claim 1, wherein the control device is configured to make the rate of change in the desired automatic steering torque lower when a magnitude of the steering torque is equal to or larger than a reference value for determining whether the driver is steering the steering wheel than when the magnitude of the steering torque is smaller than the reference value for determining whether the driver is steering the steering wheel, in the case where the steering mode switches from the manual steering mode to the automatic steering mode in the situation where determination is made that the driver is holding the steering wheel.

6. The vehicle driver assistance system according to claim 1, wherein the control device is configured to variably set the rate of change in the desired automatic steering torque according to a magnitude of the steering torque in such a manner that the rate of change in the desired automatic steering torque decreases as the magnitude of the steering torque increases.

7. The vehicle driver assistance system according to claim 1, wherein the control device is configured not to reduce the rate of change in the desired automatic steering torque when the desired index value of the steering angle of the steered wheel is a desired index value of the steering angle for moving the vehicle in a lateral direction in order to further improve driving safety of the vehicle.

8. The vehicle driver assistance system according to claim 1, wherein:
the desired automatic steering torque is a sum of desired automatic steering torque of feedforward control and desired automatic steering torque of feedback control that are torques for controlling the index value of the steering angle of the steered wheel to the desired index value; and
the control device is configured to reduce a rate of change in the desired automatic steering torque of the feedforward control.

9. The vehicle driver assistance system according to claim 1, wherein:
the desired automatic steering torque is a sum of desired automatic steering torque of feedforward control and desired automatic steering torque of feedback control that are torques for controlling the index value of the steering angle of the steered wheel to the desired index value; and
the control device is configured to reduce a rate of change in the sum.

* * * * *